Figure 1:
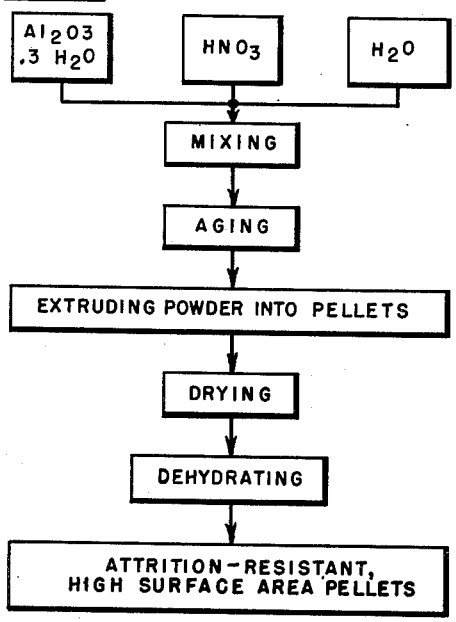

Oct. 8, 1957    E. B. CORNELIUS ET AL    2,809,170
EXTRUDING ATTRITION RESISTANT ALUMINA PARTICLES
Filed June 10, 1957

INVENTORS.
Edward B. Cornelius,
Thomas H. Milliken, Jr.
& George A. Mills
BY John R. Ewbank
ATTORNEY.

United States Patent Office

2,809,170
Patented Oct. 8, 1957

2,809,170

EXTRUDING ATTRITION RESISTANT ALUMINA PARTICLES

Edward B. Cornelius, Swarthmore, Thomas H. Milliken, Jr., Moylan, and George Alexander Mills, Swarthmore, Pa., assignors to Houdry Process Corporation, Wilmington, Del., a corporation of Delaware Application June 10, 1957, Serial No. 664,713

5 Claims. (Cl. 252—465)

This invention relates to methods of preparing large particles of alumina having a high resistance to attrition, said particles being suitable for many purposes such as carriers for dehydrogenation catalysts.

This is a continuation-in-part of our application, Serial No. 510,868, filed May 24, 1955, now abandoned. Both it and this include some common subject matter first disclosed in the application entitled "Method of Preparing Attrition Resistant Alumina Particles," filed December 24, 1954, Serial No. 477,596, by E. B. Cornelius and T. H. Milliken, Jr.

The petroleum industry has long employed a test utilizing a standard ball mill to measure the resistance to attrition of catalyst particles having minimum dimensions of from 2–13 mm. According to this test, a weighed sample of catalyst particles of a narrow range of size distribution is subjected to the action of a ball mill. The catalyst and four stainless steel balls are tumbled in a thick stainless steel can rotated at 80 R. P. M. for one hour. The catalyst is screened to remove the fines, and that portion of the particles about as large as the initial sample is weighed. The weight percentage of catalyst particles retaining their large size after the one hour treatment in the standard ball mill indicates the degree of attrition resistance of the particles. This ball mill test is very severe, and accomplishes within one hour substantially as much attrition as would result in several months' operation of a typical gravitating bed installation. The petroleum industry has generally employed the term "hardness index" to designate the results of this ball mill test, but by reason of the confusion resulting from the varied meanings of "hardness" the results are herein described as percentage retention of large size after one hour ball mill testing.

Solid fused corundum spheres can be subjected to the ball mill test with the recovery of about 99% of the large size spheres, but such high resistance to attrition is not necessary for a gravitating bed of contact material. More than 60% of the silica-alumina catalyst particles ordinarily employed in a gravitating bed withstand the ball mill test, and some commercially employed silica-alumina catalyst particles are recoverable to the extent of about 92% after the ball mill test.

Commercially available activated alumina particles possessing superior crush resistance and sometimes designated in the trade as "hard alumina" have been found to possess poor attrition resistance, measured as a recovery of approximately 6% of the particles after the one hour ball mill test. Thus the commercially available activated alumina particles, although of outstanding crush resistance, and although sometimes called "hard alumina," have been unsuitable for gravitating bed methods by reason of their poor attrition resistance. The present invention relates to the preparation of predominantly alumina contact material having a sufficient resistance to attrition to retain greater than 60% by weight of the particles in their large size throughout the one hour ball mill tests. The usefulness of such contact material for methods utilizing a gravitating bed illustrates its high degree of attrition resistance, but the contact material may also advantageously be employed in other procedures. In the loading and unloading of fixed beds of the particles of the present invention, relatively few fines are formed by reason of the outstanding attrition resistance.

The alumina of the present invention is gamma, various forms of which are sometimes designated delta alumina, kappa alumina, and eta alumina. These gamma aluminas are effective catalyst carriers and/or catalysts having a structure distinguishable by X-ray diffraction from alpha alumina. Gamma alumina can be identified by X-ray diffraction by the combination of lines at 2.41, 1.98 and 1.39 Angstroms. At temperatures within the range of from about 650 to 3650° F., depending on the acidity, steam pressure, absolute pressure, stabilizer effectiveness, and other factors, gamma alumina is transformed to alpha alumina, which can be identified by X-ray diffraction by the combination of strong lines at 3.48, 2.55, 2.08 and 1.60 Angstroms.

When wet materials are dried, water vapor is driven off. The effluent gas stream from a drying zone may consist of: (a) water vapor exclusively; (b) air saturated with water vapor at that temperature; or (c) a mixture of water vapor and a gas introduced to control the gas flow within the drying zone. The space velocity of the auxiliary gas stream can be controlled relative to the rate of evolution of water vapor by the drying conditions in order to maintain low humidity in the effluent from the drying zone. Thus by blowing very large amounts of dry gas through the drying zone, the moisture content of the effluent gas stream is reduced.

In accordance with the present invention, alumina particles having such outstanding attrition resistance to be more than 60% recoverable after a one hour ball mill test, are prepared by a method in which; powdery particles of alumina trihydrate are impregnated with nitric acid, the amount of liquid being so small that even after impregnation, the composition has powdery characteristics, there being from 5 to 9, preferably 6 to 8, and desirably about 7% of 100% nitric acid in the impregnated powder; the acid and trihydrate are allowed to react for more than one hour to form a minor amount of aluminum nitrate throughout the alumina trihydrate; the impregnated and reacted powder is then subjected to significant mechanical pressure, mixing, extruding and slicing to form particles having minimum dimensions of from 2 to 13 mm. These particles, which are sufficiently cohesive to be handled, are quickly transferred to a chamber maintained below 300° F. and above 220° F., desirably about 270° F. for rapid drying under low humidity conditions for from 10 to 60 minutes, a dry auxiliary gas stream being passed through the particles at a space rate greater than 10 volumes of auxiliary gas per volume of particles per hour, and the thus dried particles are slowly heated for several hours, relatively high humidity conditions being maintained at least through the 400 to 600° F. range, and the peak temperature being at least 700° F., an auxiliary gas being passed through the particles at a low space rate to maintain said high humidity conditions.

The alumina trihydrate employed as a starting material herein is a fine powder. After the impregnation with the concentrated nitric acid solution, the composition has powdery characteristics. Instead of adding much liquid to form a slurry or paste, the concentrated acid is employed merely to impregnate the alumina trihydrate, which has powdery characteristics even after impregnation. The nitric acid content of the impregnated powder is carefully controlled within the range of 5 to 9%, preferably 6 to 8% and desirably 7%, based on 100% nitric acid. It is generally desirable to use an aqueous solution of nitric acid, but because the weight of diluting water is less than the weight of the commercial acid employed, the solution is designated as concentrated acid. The alumina trihydrate and acid are permitted to react to form aluminum nitrate which is distributed throughout the alumina trihydrate. The time necessary for effective completion of the reaction is generally more than one hour at the temperatures usually encountered, but may, as at higher temperature, be somewhat less than one hour.

The powder, after impregnation and after the nitric acid has reacted to form aluminum nitrate, goes by a vibratory feeder to an extruding machine. Heretofore it has been considered necessary to form a slurry or paste or dough of relatively greater water content in order to extrude alumina trihydrate, but by the present invention the impregnated, reacted powder is fed to the extruder by a vibratory feeder, and is then immediately extrudable at high pressures and at high extrusion rates. The rods of extruded alumina trihydrate are sliced into pellets. The pellets, immediately after extrusion, and before drying, are so free from excess moisture that the pellets can slide down an inclined chute without sticking to each other and can be handled in a shallow gravitating bed without aggregation or cohesion.

The initial drying of the freshly extruded particles is quite fast and is carefully controlled in order to prevent the development of large crystallites of aluminum salt within the particle. This first stage drying brings about a further increase in the nonadhesiveness of particles very rapidly because substantially all of the water except that necessary for the hydrates of the components, is removed under low humidity conditions.

The pellets are subjected for from about 10 to 60 minutes to a dry gas stream maintained at a temperature above 220° F. and below 300° F., desirably about 270° F.

After the rapid drying at low humidity conditions the particles are subjected to a carefully controlled slow drying to a temperature of about 600° F. to remove most of the hydrate water, and to form a gamma alumina particle. Such heating also decomposes the nitrate anion of the aluminum nitrate salt, thus forming alumina from the aluminum nitrate distributed throughout the pellet. The temperature is raised from about 270° F. to about 600° F. at a slow rate during a period of several hours. As the pellet is raised from 400° F. to 600° F., and desirably during most of the heating from 300° F. to 800° F., high humidity conditions are maintained so that the volume concentration of steam is at least 50%. The humidity is controlled in part by passing an auxiliary gas stream at a low space rate through the particles being heated from 400° F. to 600° F. The decomposition of the hydrate evolves some steam, which is allowed to escape so slowly as to maintain the 50% humidity conditions.

It is sometimes desirable to subject the attrition resistant gamma alumina particle to a dry atmosphere to a temperature within the range from about 800° F. to 1700° F., in order to adjust the surface area to meet the requirements for the particular use of the particle. The moisture content of the gamma alumina may also be controlled by the severity of this adjustment of surface area. The oven in which the final heating is conducted is desirably maintained within the range from about 1350° F. to about 1600° F. Such treatment is desirably conducted for from one to six hours, and the heating of the particle to the surface adjusting conditions may be rapid, as distinguished from the slow heating during the 400-600° F. treatment. For example, four hours at 1350° F. in 100% steam reduces surface area from about 220 m.²/g. to about 80 m.²/g., or similar surface reduction is achieved by four hours at 1650° F. in bone dry air or by equivalent surface reduction treatment. Surface area adjustment is generally within the 1200-1675° F. temperature range.

Figure 2:
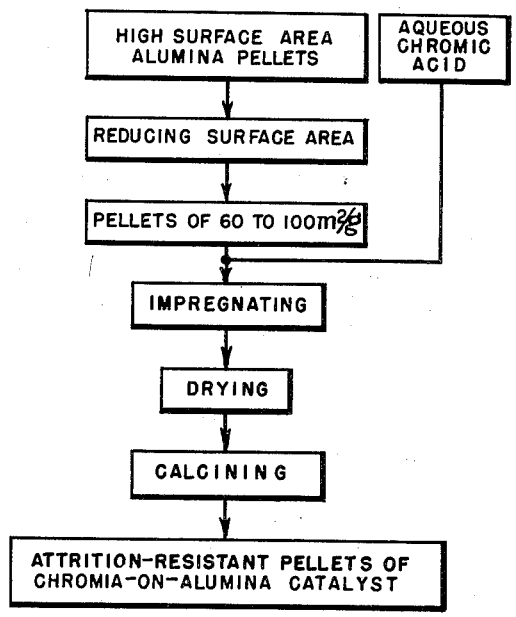
Figure 3:
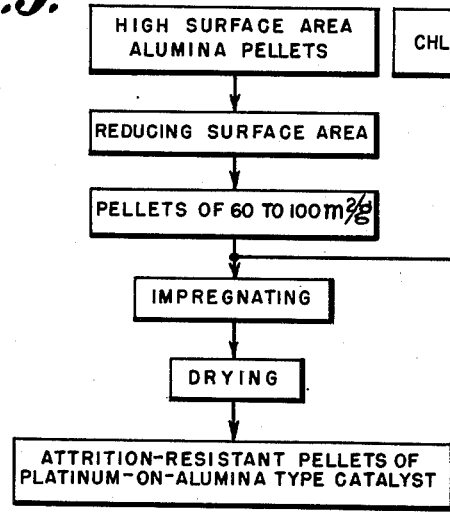

A flow sheet indicating the chronology and material flow of the several examples is shown in the drawing, which is generally self-explanatory. The preparation of high area alumina pellets, chromia-alumina catalyst pellets, and platinum-on-alumina type catalyst pellets are shown respectively in Figs. 1, 2 and 3.

The technical subject matter can be further clarified by reference to a series of examples.

*Example 1*

A quantity of commercially available Alcoa C–31 brand of alumina trihydrate is agitated in a tumbling drum while being sprayed with an aqueous solution consisting of six parts of commercial (67%) nitric acid and one part of water, whereby the impregnated alumina trihydrate contains 7.15% nitric acid (100% basis). The nitric acid and alumina trihydrate are allowed to react for more than an hour. If during this time samples of the impregnated powder are tested by mixing with distilled water and measuring the pH of the solution, it is found that the initial extract has a pH less than 1, and that the pH of successive extracts rises until it levels off at about pH 3. The impregnated alumina trihydrate retains some powdery characteristics both initially, and after the acid has reacted with the trihydrate. Some heat is generated by the reaction of the acid with the alumina trihydrate, and it is usually necessary to cool the impregnated alumina prior to the extrusion step. If desired the impregnated powder can be stored in open containers for a day before extrusion, whereby both adequate reaction and adequate cooling are achieved. Unless the extruder has unusual cooling facilities, the powder should be cooled below 130° F. before transfer to the extruder.

The impregnated, reacted, and cooled powder may if desired be supplied to an extrusion machine by a vibratory feeder, thus illustrating the powdery characteristics of the slightly damp material. By very high mechanical pressure the powder is extruded as rods which are sliced to form pellets. The extruded pellets do not readily adhere to each other and are not so fragile as to require extreme care during the subsequent manufacturing operations.

Immediately after extrusion, the pellets are subjected to a rapid drying operation at a temperature above 220° F. and below 300° F. (desirably about 270° F.) to remove most of the initial water content. This initial drying does not remove the water present as a hydrate. The rapid drying is achieved by the control of both the temperature and the space rate of the auxiliary gas. At least ten and usually more than twenty volumes of air per volume of pellets flow past the pellets per hour, thereby maintaining relatively low humidity conditions in the effluent from the rapid drying zone. It is generally desirable to employ a heated gas stream, such as encountered in an oven having a forced circulation of air, in order to maintain low humidity and in order to remove the water within from 10 to 60 minutes. The rate of heating is governed by the extent to which each particle is contacted by the hot air, the space rate of air circulation and related factors. In the preferred drying procedure, the pellets are subjected to a rapid stream of 270° F. dry air for about ten minutes.

After the rapid drying at low humidity, particles are subjected to a slow drying throughout the range of from about 300° F. to about 600° F., drying conditions being so controlled as to maintain high humidity in the drying zone. The attrition resistance of the finished particles is peculiarly dependent upon the control of conditions during the removal of the hydrate water. The gamma alumina particles thus formed ordinarily have a surface area of about 200 m.²/g. and are useful as carriers for some types of catalysts.

If a catalyst carrier of only about 60 to 100 m.²/g. is desired, as is necessary for preparing conventional chromia catalysts, the particles may be subjected to a surface area adjustment treatment. Such a lessening of surface area can be achieved thermally by rapidly heating the particles to a higher temperature such as about 1000° F., but desirably not greater than about 1400° F. The more rapid heating is both more economical and more effective in bringing about the controlled removal of a portion of the residual water content of the gamma-alumina than a slow heating in this temperature range. Care is exercised to avoid the formation of alpha alumina by restricting the time, temperature, humidity and acidity of the treatment.

The attrition resistant gamma alumina particles may be employed in substantially any of the methods for which microporous gamma alumina has been found useful. For example, the particles can be employed as a carrier for platinum in a catalyst for aromatizing or reforming gasoline. The particles can be impregnated with chromic oxide and utilized as a dehydrogenation catalyst. The particles can be employed in a gravitating bed, either as alumina particles or as alumina-impregnated-with-a-catalyst by reason of their outstanding attrition resistance. The improved attrition resistance is also of considerable advantage in fixed bed operations, in which case the alumina particles of the present invention form fewer fines during the loading and unloading operations.

*Example II*

Chromia-on-alumina catalysts utilizing the attrition resistant alumina of the present invention possess not merely advantageous resistance to attrition, but also improved catalytic properties. These catalysts appear to possess a longer useful life than similar catalysts employing commercially available alumina carriers.

Alumina pellets are prepared to have the conventional 60 to 100 m.²/g. surface area in accordance with Example I and are impregnated to deposit 20% chromia therein to prepare a dehydrogenation catalyst. As an accelerated aging test, the particles are heat treated at 1650° F. for two hours in 20% steam. A similar catalyst, differing only in the use of conventional alumina as the carrier, is subjected to the same accelerated aging test. Various samples of a technical grade of normal butane, containing from about 95.1 to about 97% normal butane, from about 2.7 to about 4.4% isobutane, from about 0.3% to about 0.5% butene, and up to about 0.2% propane are subjected to dehydrogenation conditions over the two pre-aged catalysts. The butane is passed over the catalyst at a space rate of 1 v./v./hr. for 10 minutes at 1100° F. The attrition resistant catalyst of the present invention is superior to the conventional catalyst both as to selectivity and conversion of the butane.

*Example III*

A dehydrogenation catalyst is prepared by impregnating chromia on an attrition resistant alumina pellet of the conventional 60 to 100 m.²/g. surface area prepared according to Example I. Butane is dehydrogenated over this catalyst and the results compared with those obtained with a similar catalyst employing a commercially available alumina pellet as carrier of the conventional 60 to 100 m.²/g. surface area. The attrition resistant catalyst provides a conversion superior to that of the catalyst having a conventional alumina carrier. Moreover, the chromia-on-alumina catalyst of the present invention is very attrition resistant. In the one hour ball mill test, 93% of the chromia-on-alumina particles retained their large size. Similar chromia catalyst particles prepared from conventional alumina carriers were pulverized in the one hour ball mill test, only 18% retaining their large size.

*Example IV*

Alumina pellets prepared following the mixing, aging, extruding, drying, and dehydrating steps but omitting the surface area adjustment step of the procedure of Example I had a surface area of 200 m.²/g., a bulk density of 0.85 kg./l., and 94% withstood the one hour ball mill test. Several kinds of catalyst, such as chromia dehydrogenation catalysts, and platinum reforming catalysts, posses a longer useful life if the carrier has a surface area between about 65 and 95 m.²/g., preferably about 80 m.²/g. By adjusting the surface area, various batches of the attrition resistant alumina pellets were found to have advantageous properties. Treatment of pellets with a hot dry gas instead of steam resulted in pellets possessing a surface area of 90 m.²/g., and sufficiently attrition resistant that 86% withstood the one hour ball mill test. For example, a suitable treatment consisted of heating the pellets at 1650° F. in bone dry air for 4 hours, but other surface area adjustments could be employed.

After the surface adjustment, the pellets were suitable for use as catalyst carriers.

*Example V*

Using a procedure generally like that of Example I, pellets are extruded and rapidly dried to about 270° F., and then slowly heated from about 270° F. to about 600° F. under high humidity conditions. The pellets are then cooled and leached with acid to remove alkali. For example, the pellets can be immersed for about one hour in a plurality of fresh batches of 10% acetic acid. Nitric acid or solutions of aluminum nitrate can be employed in the leaching instead of acetic acid. Traces of sodium salts are removed more completely when the leaching is conducted just after the removal of much of the hydrate water than either before or after this stage. The heating to about 600° F. makes the trace of sodium more available to leaching, but heating to 1450° F. makes the alkaline impurities less available.

After the acid leaching, the pellets are dried rapidly, and are heated in a 1600° F. furnace for four hours. This calcining and surface area adjustment reduces the area of the pellets from about 200 m.²/g. to about 75 m.²/g. The cooled pellets are wetted with a solution of chloroplatinic acid, and heated slowly up to about 250° F. to provide about 0.5% platinum as chloroplatinate on an attrition resistant carrier.

*Example VI*

A noble metal dehydrogenation catalyst is prepared, using features of the previous example to provide a gasoline reforming catalyst of outstanding attrition resistance, and a bulk density of 830 g./l. This catalyst is used to upgrade gasoline, employing a hydrogen to naphtha mol ratio of 7.

A reforming catalyst utilizing the attrition resistant alumina particles of the present invention is designed to possess performance characteristics comparable to those of platinum-on-alumina catalysts employed industrially and to possess the further advantage of outstanding attrition resistance. Although platinum-on-alumina catalysts are generally employed in a fixed bed instead of a gravitating bed, the improved attrition resistance is highly advantageous. Most of the platinum is at or near the outer surface of the particle of catalyst (e. g., in a spherical bead of reforming catalyst, not only the center but also a zone extending from the center more than halfway to the periphery would be free from platinum) so that the formation of even traces of fines results in relatively large losses of platinum.

Obviously many modifications and variations of the invention as hereinbefore set forth may be made without departing from the spirit and scope thereof, and therefore only such limitations should be imposed as are indicated in the appended claims.

What is claimed is:

1. The method of preparing attrition resistant alumina particles having minimum dimensions within the range of from about 2 to 13 mm., which includes the steps of impregnating an alumina trihydrate powder with an aqueous solution containing nitric acid, there being from about 5 to about 9 pounds of 100% nitric acid per 100 pounds of impregnated powder, said impregnated powder having powdery characteristics by reason of its low water content, causing the nitric acid to react with the alumina for more than one hour to form aluminum nitrate as a minor component distributed throughout the powdery impregnated alumina trihydrate; subjecting said impregnated and reacted powder to mechanical pressure, mixing and extruding to form particles sufficiently cohesive to be handled; quickly subjecting said particles to a chamber maintained below 300° F. and above 220° F. for from 10 to 60 minutes for rapid drying under low humidity conditions, a dry auxiliary gas stream being passed through the particles at a space velocity greater than 10 v./v./hr.; subjecting the thus dried particles to a temperature increasing to about 800° F. at a controlled slow rate of temperature increase for several hours in the presence of more than 50% steam, the steam being withdrawn by a stream of auxiliary gas at a low space rate, whereby a portion of the hydrate water is removed from the particles, and whereby the particles develop gamma-alumina characteristics, and withdrawing particles of attrition resistant gamma-alumina particles having minimum dimensions within the range of from about 2 to 13 mm.

2. The method of preparing particles of a dehydrogenation catalyst in which the alumina particles of claim 1 are impregnated with from about 10 to about 50% chromia.

3. The method of preparing particles of dehydrogenation catalyst in which the alumina particles of claim 1 are impregnated with chloroplatinic acid providing in the catalyst from about 0.1 to about 2% platinum.

4. The method of claim 1 in which about 7 pounds of 100% nitric acid are contained in the impregnated powder.

5. The method of preparing attrition resistant alumina particles having minimum dimensions within the range of from about 2 to 13 mm., which includes the steps of: preparing a powder containing purified hydrated alumina with not more than trace amounts of impurities and consisting essentially of alumina trihydrate; impregnating the alumina trihydrate powder with concentrated nitric acid to form an impregnated powder containing from about 6 to about 8 pounds of 100% nitric acid per 100 pounds of impregnated powder; causing the nitric acid to react with the alumina for more than one hour to form aluminum nitrate as a minor component distributed throughout the powdery impregnated alumina trihydrate; extruding the thus impregnated and reacted alumina-trihydrate-nitrate under high mechanical pressure to form particles sufficiently cohesive to be handled; quickly subjecting said particles to a chamber maintained below 300° F. and above 220° F. for from 10 to 60 minutes for rapid drying under low humidity conditions, a dry auxiliary gas stream being passed through the particles at a space velocity greater than 10 v./v./hr.; and subjecting the thus dried particles to a temperature increasing to about 800° F. at a controlled slow rate of temperature increase for several hours in the presence of more than 50% steam, the steam being withdrawn by a stream of auxiliary gas at a low space rate, whereby a portion of the hydrate water is removed from the particles, and whereby the particles develop high surface area gamma-alumina characteristics.

References Cited in the file of this patent

UNITED STATES PATENTS

| | | |
|---|---|---|
| 2,127,504 | Derr et al. | Aug. 23, 1938 |
| 2,450,766 | Nixon et al. | Oct. 5, 1948 |
| 2,480,520 | Thacker | Aug. 30, 1949 |
| 2,585,033 | Pitzer | Feb. 12, 1952 |
| 2,709,173 | Brengle et al. | May 24, 1955 |